(12) United States Patent
Ehrat et al.

(10) Patent No.: US 12,383,983 B2
(45) Date of Patent: Aug. 12, 2025

(54) APPARATUS FOR CREATING A HOLE IN A GLASS CONTAINER

(71) Applicant: ORVINUM AG, Magden (CH)

(72) Inventors: Markus Ehrat, Magden (CH); Claudio Furrer, Dagmersellen (CH); Beat Luscher, Suhr (CH)

(73) Assignee: ORVINUM AG, Magden (CH)

( * ) Notice: Subject to any disclaimer, the term of this patent is extended or adjusted under 35 U.S.C. 154(b) by 661 days.

(21) Appl. No.: 17/766,397

(22) PCT Filed: Oct. 5, 2020

(86) PCT No.: PCT/EP2020/077891
§ 371 (c)(1),
(2) Date: Apr. 4, 2022

(87) PCT Pub. No.: WO2021/064255
PCT Pub. Date: Apr. 8, 2021

(65) Prior Publication Data
US 2022/0402075 A1   Dec. 22, 2022

(30) Foreign Application Priority Data

Oct. 3, 2019  (EP) .................................... 19201358

(51) Int. Cl.
B23K 26/382   (2014.01)
B23K 26/03    (2006.01)
(Continued)

(52) U.S. Cl.
CPC ............ *B23K 26/389* (2015.10); *B23K 26/03* (2013.01); *B23K 26/0622* (2015.10);
(Continued)

(58) Field of Classification Search
CPC .. B23K 26/389; B23K 26/03; B23K 26/0622; B23K 26/402; B23K 26/08;
(Continued)

(56) References Cited

U.S. PATENT DOCUMENTS 5,705,928 A  *  1/1998  Haner ................. G01R 33/307
                                                324/320
6,140,404 A     10/2000  Ono et al.
(Continued)

FOREIGN PATENT DOCUMENTS

EP   1 832 376 A2   9/2007
JP      2018202449  12/2018

OTHER PUBLICATIONS

Lucas A. Hof et al: "Micro-Hole Drilling on Glass Substrates—A Review", *Micromachines* 2017, 8, 53.
(Continued)

*Primary Examiner* — Laura Martin
*Assistant Examiner* — Anthony W Megna Fuentes
(74) *Attorney, Agent, or Firm* — Buscher Patent PLLC

(57) ABSTRACT

The invention provides an apparatus for creating a hole in a glass container with a medium stored therein, comprising: a laser system configured to focus laser pulses with a wavelength in the ultraviolet regime onto the glass container such as to create a hole in the glass container by laser ablation preferably without creating significant amounts of glass particles inside and outside the glass container.

18 Claims, 18 Drawing Sheets

(51) Int. Cl.
*B23K 26/0622* (2014.01)
*B23K 26/402* (2014.01)
*G01N 1/10* (2006.01)
*B23K 26/08* (2014.01)
*B23K 26/70* (2014.01)
*B23K 103/00* (2006.01)

(52) U.S. Cl.
CPC ............. *B23K 26/402* (2013.01); *G01N 1/10* (2013.01); *B23K 26/08* (2013.01); *B23K 2103/54* (2018.08); *G01N 2001/1037* (2013.01)

(58) Field of Classification Search
CPC .. B23K 2103/54; B23K 26/382; B23K 26/70; G01N 1/10; G01N 2001/1037
See application file for complete search history.

(56) References Cited

U.S. PATENT DOCUMENTS

| | | |
|---|---|---|
| 9,139,412 B2 | 9/2015 | Lambrecht |
| 9,278,886 B2 | 3/2016 | Boek et al. |
| 9,442,086 B2 | 9/2016 | Hofmann |
| 2009/0013724 A1 | 1/2009 | Koyo et al. |
| 2016/0018375 A1 | 1/2016 | Fahrni et al. |
| 2016/0257610 A1 | 9/2016 | Kodama et al. |
| 2017/0001850 A1 | 1/2017 | Rider et al. |
| 2017/0283299 A1 | 10/2017 | Bookbinder et al. |

OTHER PUBLICATIONS

Nadezhda M. Bulgakova et al, "How to Optimize Ultrashort Pulse Laser Interaction with Glass Surfaces in Cutting Regimes?", *Applied Surface Science* 336 (2015) 364-374.

\* cited by examiner

APPARATUS FOR CREATING A HOLE IN A GLASS CONTAINER

The invention generally relates to an apparatus and a method for creating a hole in a glass container with a medium stored therein. The invention further relates to a system for extraction of a medium stored in a glass container.

To extract a medium from a closed glass container, e.g. a wine sample from a wine bottle, is well known in the art. In particular, techniques to extract a wine sample from a closed wine bottle may involve the insertion of a needle through the cork of the bottle. For example, US 2017/0001850 A1 describes the extraction of a beverage from a beverage bottle, such as a wine bottle, using an extraction device. The bottle may be supported by a bottle support sleeve that surrounds all but the neck and closure at the bottle opening. The extraction device may be secured to the neck and a needle, such as a pair of needles or a two-lumen needle, may be inserted through the closure to inject pressurized gas into the bottle and to remove beverage from the bottle by the needle. The support sleeve may support the bottle during beverage extraction, e.g., by compressing the bottle exterior.

Similarly, U.S. Pat. No. 9,139,412 B2 describes devices and methods for extracting fluids from within a container sealed by a cork or septum without removal of the cork or septum or contamination of the fluid within the container by reactive gases or liquids. Embodiments of the device can include a needle connected to a valve which is in turn connected to a source of pressurized gas for displacing the fluid. Further embodiments of the device can comprise additional components that act to force the needle to be inserted through the cork or septum along a linear path, to aid in preventing buckling of the needle, to clamp the device to the container, to prevent expulsion of the cork or septum from the container, and to guide the needle through a specified region of the cork or septum. This device is particularly suited for the dispensing and preservation of wine.

U.S. Pat. No. 9,442,086 B2 describes a method for analyzing wine by puncturing the closure of a wine bottle containing wine with a disposable cannula having a lateral cannula opening and a female Luer connection, and filling a disposable syringe having a male Luer connection with an inert gas. US 2016/0018375 A1 further describes authentication of a beverage by forming an airtight seal with a bottle that contains the beverage, the bottle being sealed with a closure, applying a vacuum to the bottle to draw a sample from the closure that includes traces of the beverage, collecting the sample over time as the vacuum is applied to the closure, and performing testing on the collected sample.

In summary, the known techniques for extracting and analyzing the content of a closed bottle rely on using the closure, e.g. the cork, of the bottle to extract the medium therethrough. However, these techniques have several disadvantages. For example, cork pieces may fall into the wine due to the insertion of the needle. In addition, the force exerted on the cork created by the insertion of the needle may cause the cork to be pushed into the bottle. Furthermore, these methods for extracting the medium may cause incorrect results of the subsequent analysis, e.g. by transfer of material deposited on the cork or cork material itself to the needle.

It is an objective of the present invention to overcome the disadvantages of the prior art and to provide an apparatus and a method to access the medium stored in a glass container. The present invention is based on the idea to create a hole in the glass container with a medium stored therein using a laser system.

Known techniques to create holes in glass pieces may include mechanical drilling, abrasive jet machining, ultrasonic drilling, laser machining, wet etching, and assisted hybrid micromachining techniques.

The glass microfabrication technology is usually chosen depending on the glass type and on the required device properties. The main common challenge for glass micromachining technologies, though, is to deal with the relatively large glass hardness and brittleness. Since conventional techniques such as mechanical drilling have their limitations, a wide range of different non-conventional techniques are used for glass micro-hole drilling. Lucas A. Hof et al: "Micro-Hole Drilling on Glass Substrates—A Review", Micromachines 2017, 8, 53; doi:10.3390/mi8020053 provides a review of mechanical, thermal, chemical, and hybrid drilling processes.

Among said methods to create holes in glass pieces, laser machining (thermal method) is one possible candidate. Here, the use of carbon dioxide ($CO_2$) lasers is the most commonly used lasers, because the equipment is relatively simple and inexpensive. Further techniques include the use of excimer laser, ultra-short pulse laser, laser-induced plasma, and UV-laser with absorbent powder. In the past, all of these techniques have been studied extensively and their parameters have been optimized for glass machining. For example, a method for forming high density arrays of holes in glass is described in U.S. Pat. No. 9,278,886 B2 using laser irradiation and etching to create holes. In addition, US 2009/0013724 A1 relates to a glass processing method using a laser and processing device with an additional etching step. Moreover, Nadezhda M Bulgakova et al.: "How to Optimize Ultrashort Pulse Laser Interaction with Glass Surfaces in Cutting Regimes?", Applied Surface Science 336 (2015) 364-374 describes laser drilling for touch screens.

However, all of the above mentioned techniques for glass machining and in particular for creating holes in glass are directed to glass pieces. That is, the boundary conditions for those techniques are mainly not to destroy the glass piece and not to create any other disruption, e.g. cracks, to the structure of the glass piece. In contrast, machining of glass containers containing a medium, puts further boundary conditions on the machining technique to be used. Neither the respective boundary conditions nor their influence on the respective machining techniques has been studied yet.

Based on the above requirements, mechanical or wet etching processing may not be suitable for creating a hole in a glass container with a medium stored therein, because these techniques would contaminate the medium by the creation of glass particles or by the etchant itself. Thus, the present invention exploits the possibility to use laser systems to create holes in glass containers without deteriorating the medium stored therein.

The aforementioned medium may be a medium that is suitable for consumption, e.g. water or food, that is any nutritious substance that people or animals eat or drink or that plants absorb in order to maintain life and growth, or suitable for application, injection or inhalation, such as cosmetics and/or medicine. The aforementioned media located inside the glass container invoke certain requirements (boundary conditions) on the process of creating a hole in such a glass container. For example, the process should as much as possible avoid deterioration of the medium inside the glass container when creating the hole. Such deterioration of the medium may be caused by creating particles, such as dust or glass chips, during the drilling process and/or by etchant used to create the hole after initial laser drilling.

In addition, in the conventional art for creating holes in glass using laser techniques, as described above, the break-through detection can be done, for example, by using a photosensor, which is located on the opposite side of the glass piece. For example, U.S. Pat. No. 6,140,604 A describes a respective break-through detection method based on a photosensor for detecting that a hole has been created in a glass piece.

However, this is not possible when creating a hole in a glass container with a medium stored therein, because the respective side of the glass is not accessible for a photosensor.

Thus, it is an object of the present invention to define the relevant boundary conditions that apply for creating holes in glass container which contain a medium therein and to provide a respective apparatus and method to create holes in said glass container, which fulfill such boundary conditions.

The aforementioned objects are achieved with the features of the independent claims. Dependent claims relate to preferred embodiments of the invention.

According to an aspect of the present invention an apparatus for creating a hole in a glass container with a medium stored therein is provided. The apparatus comprises a laser system configured to focus laser pulses with a wavelength in the ultraviolet regime onto the glass container such as to create a hole in the glass container by laser ablation, preferably without creating significant amounts of glass particles inside and outside the glass container.

Preferably the energy of the laser pulses is less than twice the laser pulse energy required at the ablation threshold of the glass container to minimize the amounts of glass particles inside and outside the glass container. That is, it is preferred that the laser system is configured to focus laser pulses with an energy of less than twice the laser pulse energy required at the ablation threshold of the glass container to minimize the amounts of glass particles inside and outside the glass container More preferably, the energy of the laser pulses is less than 30% of the laser pulse energy required at the ablation threshold of the glass container.

With the aforementioned energy of the laser pulses it is possible to perform laser ablation without creating significant amounts of glass particles inside and outside the glass container. In addition, keeping the energy of the laser pulses at less than twice or less than 30% of the threshold for laser ablation may prevent cracks in the glass container.

The glass container may be a closed glass container, preferably closed or sealed with a bung, stopper, cork or a cap such as a screw cap.

The laser system may be configured to evaporate essentially all of the volume of glass on which the laser pulses are focused on. That is, the parameters of the laser system may be adjusted such that essentially all of the volume of glass on which the laser pulses are focused on is evaporated and thus creating a hole in the glass container without creating significant amounts of glass particles inside and outside the glass container.

It is preferable that the hole is created with a diameter of at least 1 mm.

The glass particles may comprise glass dust and/or glass splinters and wherein the laser system may be configured to be operated in a region around a minimum of creation of the glass dust and/or the glass splinters on the inside and the outside.

Glass dust may be defined as glass particles with a size ≤0.1 mm and glass splinters may be defined as glass particles with a size ≥0.1 mm. However, the present invention is not limited to the exact definition of the glass splinters and the glass dust.

The apparatus may further comprise a physical sensor, preferably an accelerometer or an acoustic wave detector configured to determine when the hole is created in the glass container without the need to being placed on the opposite side of the glass container onto which the laser pulses are directed.

The physical sensor may be located on or close to the glass container, preferably close to the area where the hole is created.

The physical sensor may be located on the side of the glass container onto which the laser pulses are directed. That is, the physical sensor may be located outside of the glass container and preferably on the side of the glass container onto which the laser pulses are directed.

The physical sensor may further be configured to provide feedback to the laser system during creation of the whole. That is, the physical sensor may be used to control the parameters of the laser system while creating the hole. In other words, the physical sensor may be configured to observe the process parameters of the laser system.

The laser system may be configured to stop applying laser pulses onto the glass container upon determination, by the physical sensor, that the hole has been created.

The laser system may be configured to adjust process parameters according to the physical sensor feedback.

The use of the physical sensor reduces the risk of adversely effecting the medium and/or the glass container by the laser radiation, because the laser can be stopped immediately or at least shortly after the determination that the hole is created, i.e. that the laser has broken-through the glass, and/or the process parameters of the laser system can be adjusted based on the feedback of the physical sensor.

The physical sensor may be located on an outside surface of the glass container.

The use of the physical sensor is particularly advantageous, because the opposite side of the glass onto which the laser pulses are focused is not accessible for a glass container with a medium stored therein. Thus, for example, a photodiode cannot be placed on said opposite side to determine when the laser has broken through the glass.

Alternatively, the physical sensor may be located in close proximity to the glass container, e.g. a holder, which is configured to hold the glass container.

That is, the physical sensor does not have to be located in contact with the glass container, but can also be located on any structure that is directly connected to the glass container, because e.g. when using an accelerometer, the vibrations or vibration pattern measured by the accelerometer may be transferred from the glass container to the connected structure, and thus enabling a respective measurement.

When using an accelerometer it is preferred to place the accelerometer in contact with the glass container or on a structure that is directly connected to the glass container.

Alternatively, when using an acoustic wave detector it is preferred that the acoustic wave detector is located in close proximity to the glass container.

In general, the accelerometer is configured to measure the vibrations or vibration pattern of the glass container, either directly or indirectly as described above. When the hole has been created the vibration (vibration pattern) changes and it can be determined by the accelerometer that the hole broke through.

The use of a physical sensor as described above is particularly advantageous, because the medium inside the glass container may be of high value and should preferably not be subjected to the laser pulses for a long time. In other words, by using the above described physical sensor to observe and adjust the process parameters, the time of subjecting the medium inside the glass container to the laser pulses can be reduced/minimized or eliminated.

Furthermore, the process parameters may have to be closely observed by said physical sensor and possibly adjusted during the creation of the hole, because the process parameters may depend on the exact composition of the glass container. In addition, environmental changes during the creation of the hole may further require adjustments of the process parameters.

The laser system may be configured to focus laser pulses with a repetition rate of $f \leq 10$ kHz, preferably $f \leq 7$ kHz, more preferably $2$ kHz$\leq f \leq 5$ kHz, onto the glass container.

The laser system may be configured to focus laser pulses with a repetition rate of $4$ kHz$\leq f \leq 5$ kHz for a green, black-green, olive-green, and transparent glass container and a repetition rate of $2$ kHz$\leq f \leq 5$ kHz, preferably $f=2$ kHz, for a brown glass container.

The laser system may have an average power below 20 W, preferably below 10 W, and more preferably 3.5 W or 0.644 W.

The wavelength may be between 100 nm and 400 nm, preferably between 300 nm and 400 nm, and more preferably 355 nm.

The laser system may comprise optical components configured to provide a focal point diameter between 10 μm and 40 μm, preferably 28 μm or 12 μm.

The laser system may comprise optical components configured to provide a Rayleigh length between 160 μm and 1000 μm, preferably 700 μm or 250 μm.

The optical components may be configured to provide a focal length below 300 mm, preferably between 250 mm and 100 mm, and more preferably 250 mm or 100 mm.

The feed rate of the laser system may be between 10 mm/s and 60 mm/s, preferably between 20 mm/s and 50 mm/s, and more preferably 30 mm/s.

The pulse duration of the laser pulses may be between 5 ns and 20 ns, preferably 10 ns.

In general, it is preferable to keep the fluence within the range of the preferred parameters of the laser system described above. That is, when using a higher power for the laser system, the focal point diameter may be adjusted to be larger than the above mentioned preferred 12 μm so that the fluence is kept constant.

For example, using optical components with a focal length of 250 mm and a focal point diameter of 28 μm, the area of exposure would increase about 5.5 times compared to a focal length of 100 mm and a point diameter of 12 μm. Thus, an average power of 3.5 W may be used instead of 0.644 W to obtain the same fluence.

The apparatus may further comprise a suction device located in proximity to the area where the hole is to be created such that the suction device is configured to suck in glass particles that may be created during the hole creation.

The apparatus may further comprise positioning means configured to position the laser system and the glass container relative to each other such that the laser pulses are focused onto a portion of the glass container where an air bubble is formed on the inside of the glass container, and wherein preferably the positioning means is configured to position the laser system and the glass container relative to each other such that the laser pulses are focused onto a curved portion connecting a bottleneck and a body of the glass container.

The positioning means may be configured to position the bottle such that an air bubble is formed under the area where the hole is to be created so that the medium stays in the glass container when the hole is created. That is, the creation of the air bubble formed under the area where the hole is to be created prevents the medium to flow out of the glass container through the hole when the hole is created.

For example, the glass container (bottle) may be positioned under an angle between 30-60°, preferably 40-50°, and more preferably 45° from an upright position of the glass container.

The apparatus may further comprise a sealing apparatus configured to seal the hole in the glass container with a ceramic polymer composite or a ceramic glass material.

Both materials have the advantage that they do not deteriorate the medium inside the glass container.

The ceramic polymer composite may be a ceramic polymer composite commonly used as filling material in dental and oral medicine. For example, commercially available tetric evoceram may be used.

The sealing apparatus may comprise an ultraviolet light application unit configured to direct ultraviolet light to the ceramic polymer composite or a heating unit configured to heat the ceramic glass material.

The light application unit may be configured to direct the ultraviolet light to the ceramic polymer composite for 5-25 s, preferably 10-20 s, and more preferably approximately 10 s.

The light application unit may be configured with a spot diameter of approximately 1 cm$^2$, a repetition rate of 0.5 kHz, mean power of 0.063 W, pulse energy of $1.26 \times 10^{-4}$ J, pulse power of 6300 W, and mean power per area (area=1 cm$^2$) of 6300 W/cm$^2$.

The above parameters of the light application unit may depend on the respective ceramic polymer composite used and may be taken from the respective instruction manuals.

The laser system may be further configured to guide the laser pulses in a predetermined pattern within a predetermined area over the surface of the glass container, e.g. by a respective scanner or a robot that may allow a respective guidance of the laser pulses.

By guiding the laser pulses in a predetermined pattern within a predetermined area over the surface of the glass container a hole may be created that is bigger than the focal point. This way the volume of the hole may be evaporated completely, i.e. no significant amounts of glass particles may be created.

Another aspect of the present invention is the use of the apparatus as described above for creating a hole in a glass container.

According to another aspect of the present invention a system for withdrawal (extraction) of a medium stored in a glass container is provided. The system comprises an apparatus for creating a hole in the glass container as described above and withdrawal means (extraction means) configured to manually or automatically withdraw (extract) the medium from the glass container through the hole.

The system may further comprise an analysis unit configured to analyse the withdrawn (extracted) medium, wherein the analysis unit preferably comprises a chemical fingerprint analysis unit and/or a biological fingerprint analysis unit.

The fingerprint analysis unit may be configured to perform chromatographic separation and high resolution mass spectrometry of the medium and/or wherein the biological fingerprint analysis unit may be configured to perform DNA analysis of the medium.

Another aspect of the present invention is the use of the system for withdrawal (extraction) of a medium stored in a glass container.

According to another aspect a break-through detection apparatus for determining that a hole has been created in a glass material, preferably in a glass container, the break-through detection apparatus comprising a physical sensor, preferably an accelerometer or an acoustic wave detector configured to determine that a hole has been created in the glass material.

According to another aspect a process parameter observation apparatus for observing the progress of laser processing of a glass material, preferably a glass container, the process parameter observation apparatus comprising a physical sensor, preferably an accelerometer or an acoustic wave detector, configured to observe the progress of laser processing of the glass material.

Preferably, the process parameter observation apparatus is configured to observe the progress of laser processing of a glass material, preferably during the creation of a hole in the glass material.

The physical sensor of the break-through detection apparatus and the process parameter observation apparatus may be in accordance with the above described of the physical sensor of the apparatus for creating a hole.

According to another aspect, a sealing apparatus for sealing a hole in glass, preferably in a glass container, is provided, wherein the sealing apparatus comprises: a sealing unit configured to seal the hole in the glass with a ceramic polymer composite or a ceramic glass material.

The sealing apparatus may comprise an ultraviolet light application unit configured to direct ultraviolet light to the ceramic polymer composite or a heating unit configured to heat the ceramic glass material.

According to another aspect of the present invention a method for creating a hole in a glass container with a medium stored therein is provided. The method comprises creating a hole in the glass container by focusing laser pulses of a laser system with a wavelength in the ultraviolet regime onto the glass container, preferably without creating significant amounts of glass particles inside and outside the glass container The method may preferably further comprise setting the energy of the laser pulses to less than twice the laser pulse energy required at the ablation threshold of the glass container to minimize the amounts of glass particles inside and outside the glass container. That is, it is preferred that the creating a hole in the glass container, in particular, the focusing step may further comprise setting the laser pulses to an energy of less than twice the laser pulse energy required at the ablation threshold of the glass container to minimize the amounts of glass particles inside and outside the glass container More preferably, the energy of the laser pulses is less than 30% of the laser pulse energy required at the ablation threshold of the glass container. Thus, the method may preferably implement the aforementioned steps with setting the energy of the laser pulses to less than 30% of the laser pulse energy required at the ablation threshold of the glass container Creating the hole in the glass container may comprise evaporating essentially all of the volume of glass on which the laser pulses are focused on.

The glass particles may comprise glass dust and/or glass splinters and wherein creating the hole in the glass container may comprise operating the laser system in a region around a minimum of creation of the glass dust and/or the glass splinters on the inside and the outside.

The method may further comprise determining when a hole is created in the glass container by using a physical sensor, preferably an accelerometer or an acoustic wave detector, without the need to being placed on the opposite side of the glass container onto which the laser pulses are directed.

The method may further comprise stopping the application of the laser pulses onto the glass container upon determination, by the physical sensor, that the hole has been created.

The method may further comprise providing the physical sensor on an outside surface of the glass container or providing the physical sensor in close proximity to the glass container, e.g. a holder, which holds the glass container.

The physical sensor may be provided on or close to the glass container, preferably close to the area where the hole is created.

The physical sensor may be provided on the side of the glass container onto which the laser pulses are directed. That is, the physical sensor may be located outside of the glass container and preferably on the side of the glass container onto which the laser beam is directed.

The method may further comprise providing feedback to the laser system during creation of the whole by using the physical sensor. That is, the method may further comprise controlling the parameters of the laser system while creating the hole by using the physical sensor. In other words, the method may further comprise observing the process parameters of the laser system by using the physical sensor.

The method may further comprise adjusting the process parameters according to the physical sensor feedback.

The use of the physical sensor reduces the risk of adversely effecting the medium and/or the glass container by the laser radiation, because the laser can be stopped immediately or at least shortly after the determination that the hole is created, i.e. that the laser has broken-through the glass, and/or the process parameters of the laser system can be adjusted based on the feedback of the physical sensor.

When using an accelerometer it is preferred to place the accelerometer in contact with the glass container or on a structure that is directly connected to the glass container.

Alternatively, when using an acoustic wave detector it is preferred that the acoustic wave detector is located in close proximity to the glass container.

In general, the accelerometer may measure the vibrations or vibration pattern of the glass container, either directly or indirectly as described above. When the hole has been created the vibration (vibration pattern) changes and it can be determined by the accelerometer that the hole broke through.

The laser pulses may be focused onto the glass container with a repetition rate of $f \leq 10$ kHz, preferably $f \leq 7$ kHz, more preferably 2 kHz $\leq f \leq 5$ kHz.

The laser pulses may be focused onto the glass container with a repetition rate of 4 kHz $\leq f \leq 5$ kHz for a green, black-green, olive-green, and transparent glass container and a repetition rate of 2 kHz $\leq f \leq 5$ kHz, preferably $f=2$ kHz, for a brown glass container.

The laser pulses may have an average power below 20 W, preferably below 10 W, and more preferably 3.5 W or 0.644 W.

The wavelength may be between 100 nm and 400 nm, preferably between 300 nm and 400 nm, and more preferably 355 nm.

The laser pulses may be focused onto the glass container with a focal point diameter between 10 µm and 40 µm, preferably 28 µm or 12 µm.

The laser pulses may be focused onto the glass container with a Rayleigh length between 160 µm and 1000 µm, preferably 700 µm or 250 µm.

The laser pulses may be focused onto the glass container using optical components with a focal length below 300 mm, preferably between 250 mm and 100 mm, and more preferably 250 mm or 100 mm.

The feed rate of the laser system may be between 10 mm/s and 60 mm/s, preferably between 20 mm/s and 50 mm/s, and more preferably 30 mm/s.

The laser pulses may be focused onto the glass container with a pulse duration between 5 ns and 20 ns, preferably 10 ns.

The method may further comprise positioning the laser system and the glass container relative to each other such that the laser pulses are focused onto a portion of the glass container where an air bubble is formed on the inside of the glass container, and wherein preferably the positioning comprises positioning the laser system and the glass container relative to each other such that the laser pulses are focused onto a curved portion connecting a bottleneck and a body of the glass container.

The method may further comprise positioning the bottle such that an air bubble is formed under the area where the hole is to be created so that the medium stays in the glass container when the hole is created. That is, the creation of the air bubble formed under the area where the hole is to be created prevents the medium to flow out of the glass container through the hole when the hole is created.

The method may further comprise sealing the hole in the glass container with a ceramic polymer composite or a ceramic glass material.

The sealing may comprise applying ultraviolet light to the ceramic polymer composite or heat to the ceramic glass material.

The method may further comprise guiding the laser pulses in a predetermined pattern within a predetermined area over the surface of the glass container.

According to another aspect of the present invention a method for withdrawal (extraction) of a medium stored in a glass container is provided. The method comprises a method for creating a hole in the glass container as described above and manually or automatically withdrawing (extracting) the medium from the glass container through the hole.

The method may further comprise an analysing the withdrawn (extracted) medium, wherein the analysing preferably comprises analyzing a chemical fingerprint and/or a biological fingerprint.

Analyzing the chemical fingerprint may comprise performing chromatographic separation and high resolution mass spectrometry of the medium and/or wherein analyzing the biological fingerprint may comprise performing DNA analysis of the medium.

The glass container may be part of the apparatus or the system as described above.

According to another aspect a method for break-through detection, wherein the method comprises providing a physical sensor, preferably an accelerometer or an acoustic wave detector, and determining that a hole has been created in a glass material, preferably in a glass container by using the physical sensor.

According to another aspect a method for observation of progress of laser processing of a glass material, preferably a glass container, is provided, the method comprising observing the process parameters by a physical sensor, preferably an accelerometer or an acoustic wave detector.

Preferably, the method comprises observing the progress of laser processing of a glass material during the creation of a hole in the glass material.

The method for break-through detection and the method for observation of the process parameters may comprise respective steps as recited above with respect to the method for creating a hole, in particular in view of the steps related to the physical sensor.

According to another aspect, a method for sealing a hole in a glass container is provided, wherein the method comprises: sealing the hole in the glass container with a ceramic polymer composite or a ceramic glass material.

The method may further comprise directing ultraviolet light to the ceramic polymer composite or directing heat to the ceramic glass material.

By the present invention it is possible to create a hole in a glass container without deteriorating the medium stored therein by using laser ablation. Moreover, it is possible to identify the time at which the hole is created by using an accelerometer such that the time of application of the laser radiation to the medium can be minimized. Finally, the present invention provides a unique way of sealing the hole in the glass container by using a material that does not deteriorate the medium inside the glass container.

Any description of features in relation to any one of the aforementioned apparatuses that relate to a method of using the respective apparatus may be provided by a respective processor configured to carry out the respective method steps. That is, even if not explicitly mentioned, any method steps mentioned with respect to an apparatus may be implemented by the use of a respective processor that is configured to carry out the respective method steps. The respective processor may thus be an (internal or external) part of the respective apparatus.

BRIEF DESCRIPTION OF THE DRAWINGS

The present invention is further described with respect to exemplary embodiments by referring to the Figures, where.

DETAILED DESCRIPTION OF PREFERRED EMBODIMENTS

Figure 1:
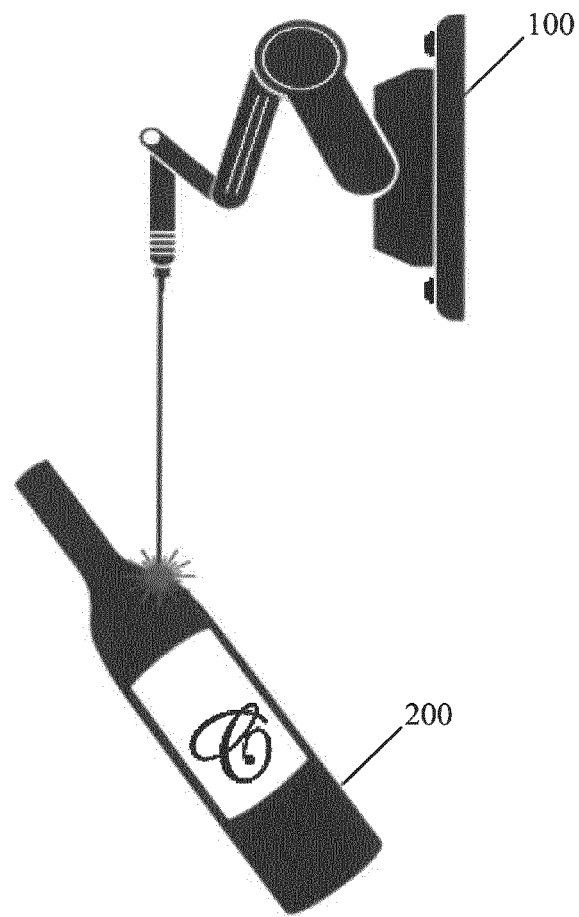
FIG. 1 illustrates a laser system according to an exemplary embodiment of the present invention.
Figure 2:
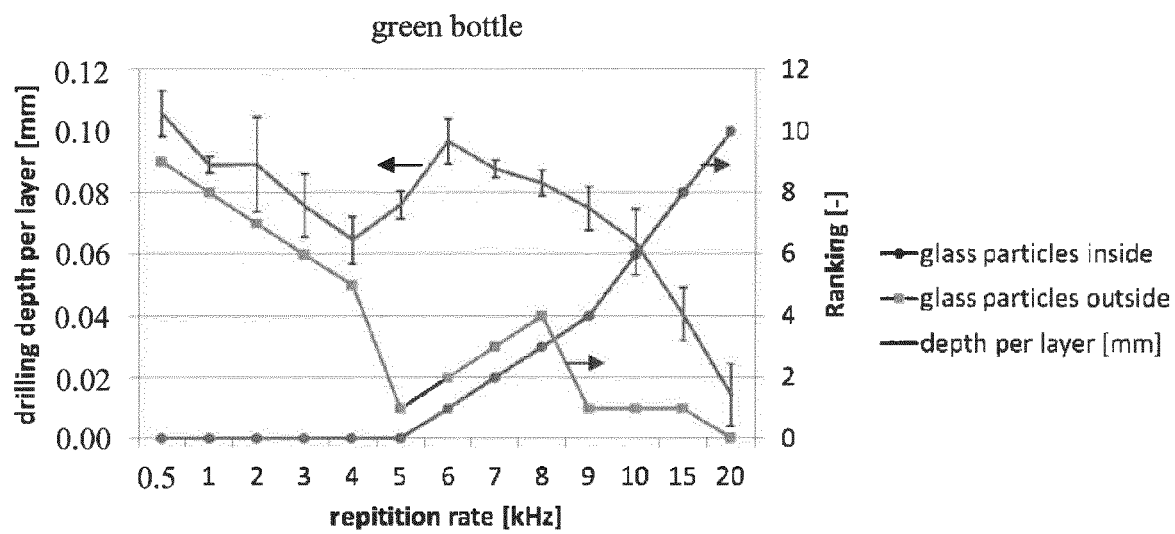
FIG. 2 shows experimental data for a green glass bottle obtained by the embodiment of FIG. 1.
Figure 3:
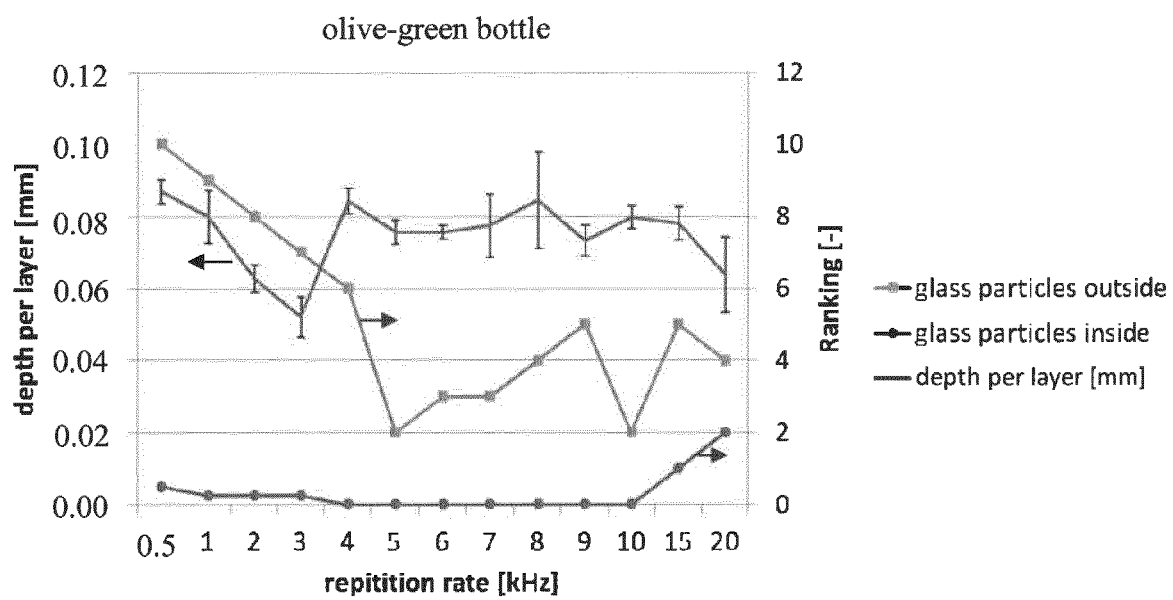
FIG. 3 shows experimental data for a olive-green glass bottle obtained by the embodiment of FIG. 1.
Figure 4:
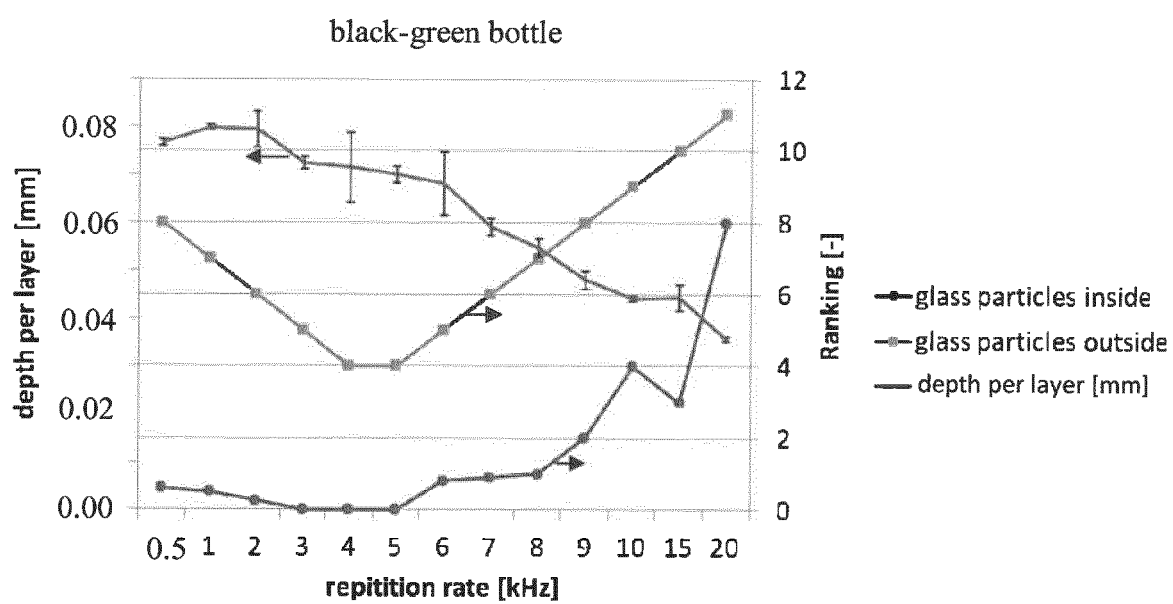
FIG. 4 shows experimental data for a black-green glass bottle obtained by the embodiment of FIG. 1.
Figure 5:
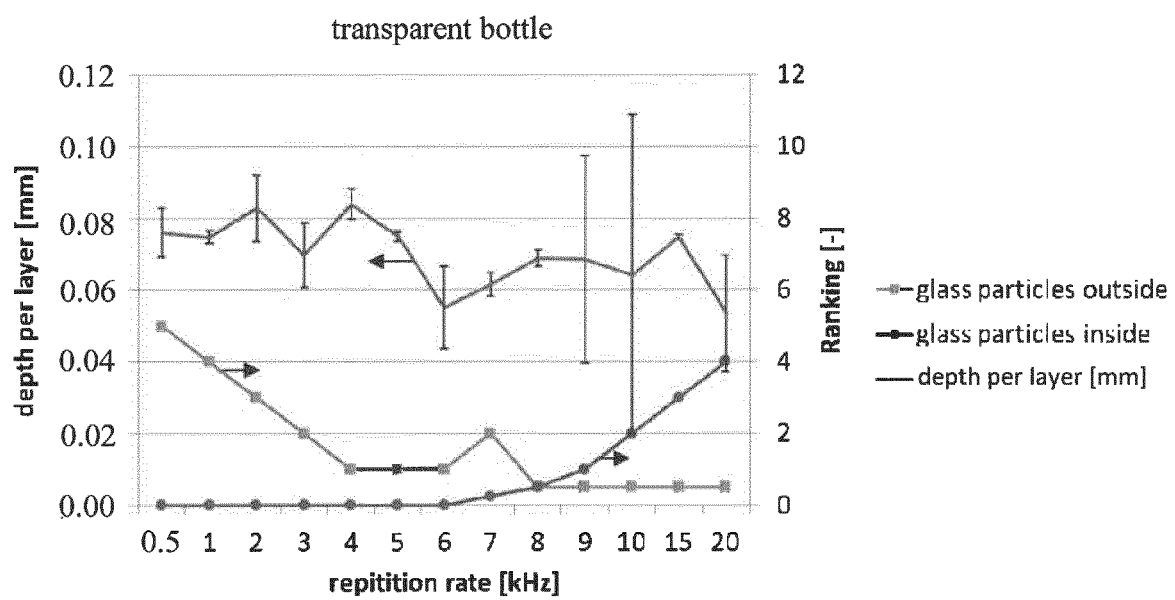
FIG. 5 shows experimental data for a transparent glass bottle obtained by the embodiment of FIG. 1.
Figure 6:
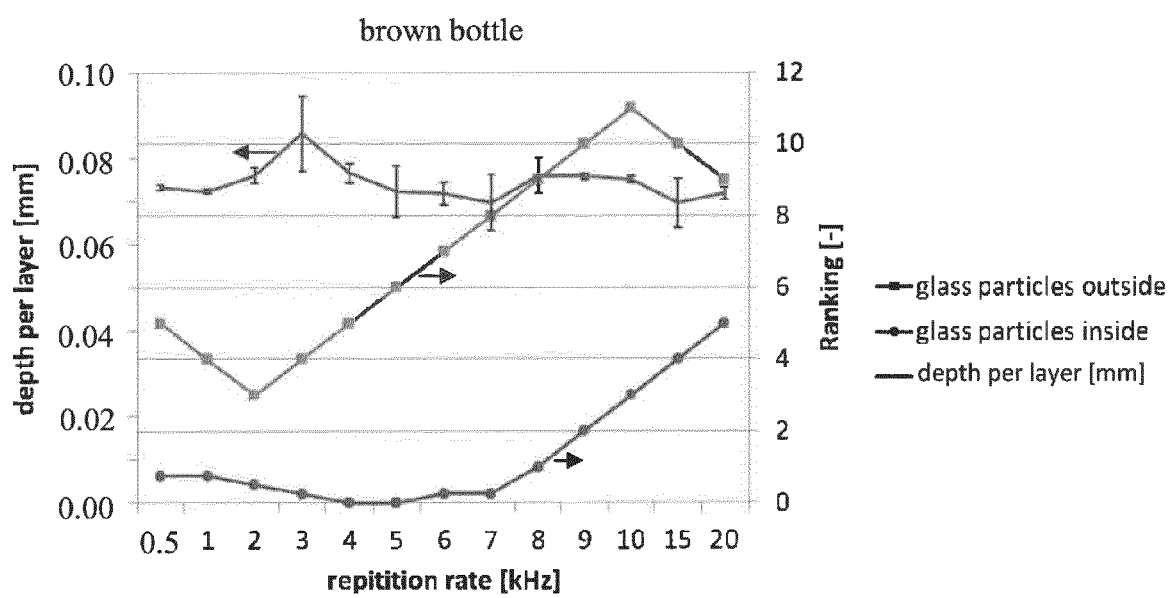
FIG. 6 shows experimental data for a brown glass bottle obtained by the embodiment of FIG. 1, FIGS. 7a and b illustrate sealing of the hole in accordance with an embodiment of the present invention, FIGS. 8a and b a setup and respective results for detecting the thickness of a glass sample for a scanning speed of 5 mm/s in accordance with an embodiment of the present, FIGS. 9a and b a setup and respective results for detecting the thickness of a glass sample for a scanning speed of 10 mm/s in accordance with an embodiment of the present.

FIG. 1 shows a laser system 100 and a glass container 200. According to the first embodiment, the glass container 200 is a bottle 200, which contains a medium, e.g. wine. The laser system 100 will now be described in more detail with reference to FIG. 1. However, the present invention is not limited by the specific parameters of the laser system 100. In contrast, the parameters of the laser system 100 mentioned and described herein are merely exemplary. The actual parameters of a laser system 100 used for creating a hole in a glass container 200 may vary from the parameters described herein without departing from the scope of the present invention.

According to the exemplary embodiment, the laser system 100 is configured to focus laser pulses with a wavelength in the ultraviolet regime onto the glass container 200 such as to create a hole in the glass container 200 by laser ablation preferably without creating significant amounts of glass particles inside and outside the glass container 200.

According to one embodiment, the laser system 100 is operated at a wavelength of 355 nm and an average power of 0.644 W. The laser system 100 emits laser pulses with a pulse duration of 20 ns at a repetition rate between 0.5 kHz and 20 kHz. The feed rate of the laser system is 30 mm/s.

Moreover, the laser pulses are focused onto the bottle 200 by optical components with a focal length of 100 mm. The focal point diameter is set to 12 μm and the Rayleigh length is 250 μm.

According to another embodiment, the laser system is operated at an average power of 3.5 W and the laser pulses are focused onto the bottle 200 by the optical components with a focal length of 250 mm. The focal point diameter is set to 28 μm and the Rayleigh length is 700 μm.

As can be seen from FIG. 1, the laser pulses are focused in a substantially perpendicular direction onto the curved portion connecting the bottleneck and the body of the bottle 200. According to FIG. 1, this is achieved by tilting the bottle 200 from its upright position by a predetermined angle, which depends on the curvature of said curved portion of the bottle 200.

Said curved portion of the bottle 200 has the advantage that an air bubble is naturally located on the inside of the bottle 200, where the hole is created when the bottle 200 is tilted accordingly. Thus, once the hole is created, the wine does not flow out of the hole.

Furthermore, an accelerometer (not shown) is provided to determine when the hole is created in the bottle. Thus, the laser system 100 can stop applying laser pulses to the bottle 200 upon detection that the hole has been created.

Instead of the accelerometer, an acoustic wave detector may also be used to determine when the hole is created in the bottle.

In general, the accelerometer is configured to measure the vibrations or the vibration pattern of the bottle 200, either directly or indirectly. When the hole has been created the vibration or vibration pattern changes and it can be determined by the accelerometer that the hole has been created.

The accelerometer may be located on an outside surface of the bottle 200 (direct measurement of the vibrations).

Alternatively, the accelerometer may be located in close proximity to the bottle 200, e.g. a holder, which is configured to hold the bottle 200 (indirect measurement of the vibrations).

That is, the accelerometer does not have to be located in contact with the bottle 200, but can also be located on any structure that is directly connected to the bottle 200, because the vibrations measured by the accelerometer may be transferred from the bottle 200 to the connected structure, and thus enabling a respective measurement.

The time of the creation of the hole is visible in the vibration spectrum as a spread in excitation frequency range and an increase in the vibration acceleration.

For example, a piezo accelerometer from Brüel & Kjær GmbH with a sensitivity of 10 mV/ms$^2$ and a frequency spectrum of 0.3-6,000 Hz may be used. However, any suitable accelerometer may be used instead.

For the acoustic wave detector, a microphone from Brüel & Kjær GmbH with a frequency spectrum of 20-50,000 Hz may be used. However, any suitable acoustic wave detector may be used instead.

The physical sensor, i.e. the accelerometer or the acoustic wave detector, may further be used to observe and control the process parameters of the laser system 100. That is, during the creation of the hole, the physical sensor may provide feedback.

Thus, it is possible to detect process parameters such as the duration of laser ablation of one material layer, momentum of readjustment of the laser axis, and the characteristic vibrational behavior of the bottle 200.

It is preferable that the laser system is configured to cerate a hole with a diameter of ≤1 mm.

The hole to be created may be bigger than the actual focal point. In this case, it is advantages to guide the laser pulses in a predetermined pattern within a predetermined area (approximately the size of the hole to be created) over the surface of the bottle 200. This assists that the whole volume of material can be evaporated and thus no significant amounts of glass particles are created during the creation of the hole.

FIGS. 2-6 show the respective results obtained by the laser system 100 described above at different repetition rates for differently colored glass bottles.

In particular, the drilling depth per layer has been determined for different repetition rates by using a SmartScope Flash 200 together with the Measure-X software. The results are illustrated in FIGS. 2-6 by the curve with the error bars.

In addition, FIGS. 2-6 illustrate the creation of glass particles, i.e. glass dust and glass splinters at the inside and outside of the during the creation of the hole. The respective curves are illustrated in FIGS. 2-6 with squares and circles, respectively. The amount of glass particles created has been evaluated by visual inspection and ranked accordingly.

As can be seen from FIGS. 2-6, there seems to be an optimum at around 4-5 kHz. That is, at around 4-5 kHz the least glass particles are created during the creation of the hole. For the bottles of FIGS. 2-5 this seems to be the optimum working region in this regard. For the brown bottle according to FIG. 6, the optimum working point seems to lie at around 2 kHz. However, also for the brown bottle, the creation of glass particles seems to be acceptable for the region of 4-5 kHz.

However, there are further regions where the amount of glass particles created may be acceptable. For example, at 10 kHz for the olive-green bottle and at 6 kHz for the transparent bottle.

As mentioned above, the specific parameters of the laser system 100 and in particular the repetition rates described herein are merely one example of how to find optimal parameters for a particular laser system 100. These parameters shall not be construed as limiting. It will be apparent to the skilled person that any suitable laser system 100 that can be used for laser ablation may be used to tune the respective parameters such that no significant amounts of glass particles inside and outside the bottle are created during the creation of the hole.

Figure 7A:
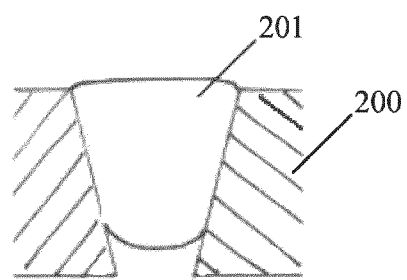

FIG. 7a illustrates sealing means to seal the hole in the bottle 200 with a ceramic polymer composite 201. The ceramic polymer composite 201 is inserted into the hole and ultraviolet light is directed to the ceramic polymer composite 201 to harden the ceramic polymer composite 201.

Figure 7B:
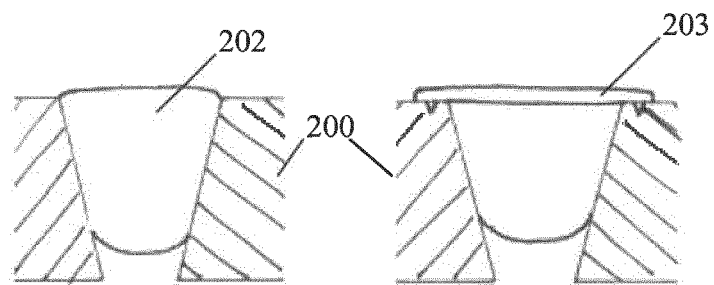

Alternatively, the hole can be sealed by using a ceramic glass material 202 as illustrated in FIG. 7b. The ceramic glass material 202 is inserted into the hole and heat is applied thereto to melt at least the top part 203 such that an airtight seal is created.

Both sealing means have the advantage that they do not deteriorate the wine stored in the bottle 200.

With reference to FIGS. 8a-9b a setup and respective results for detecting (determining) the thickness of glass in accordance with an embodiment of the present disclosure is described in the following.

Figure 8A:
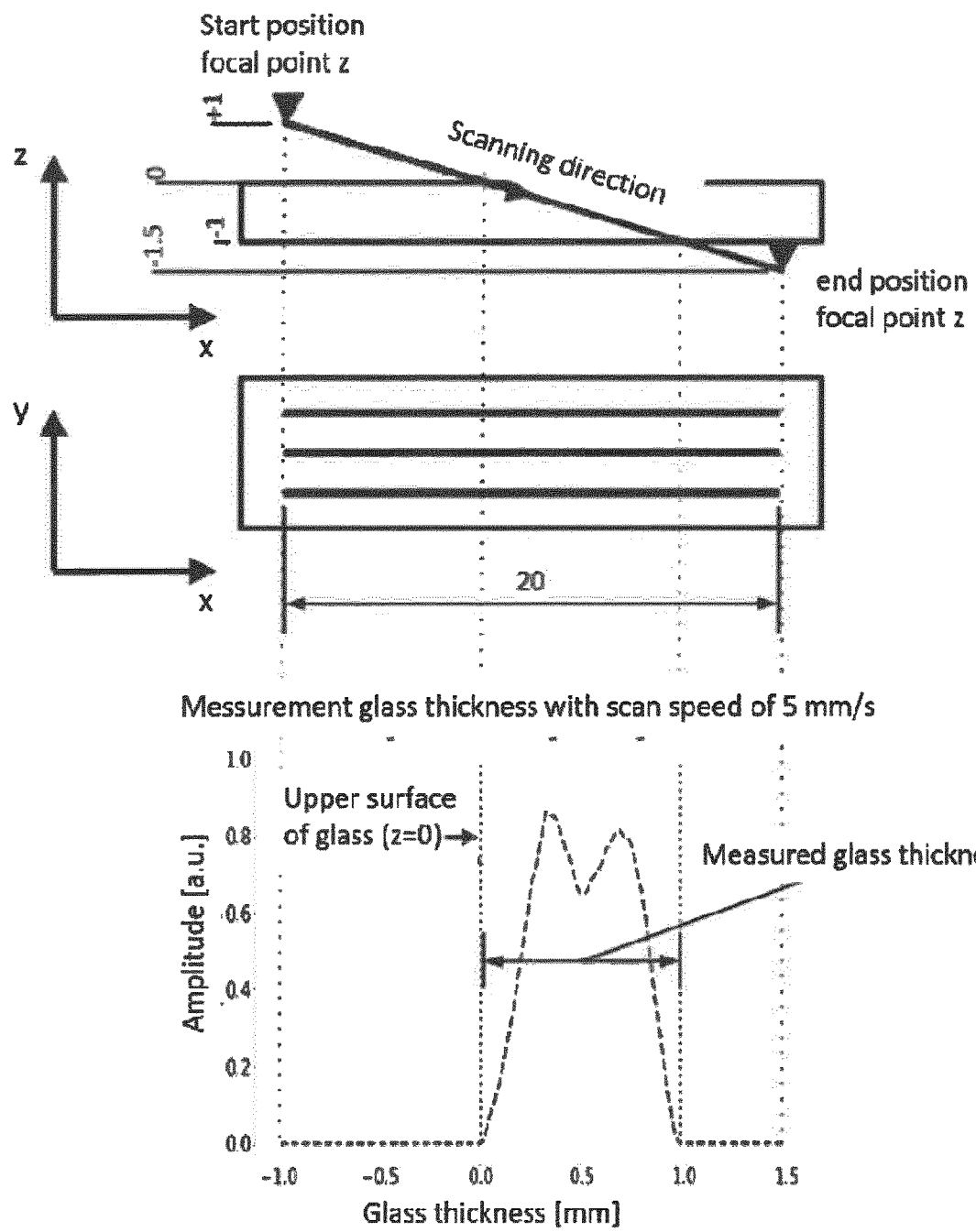
Figure 9A:
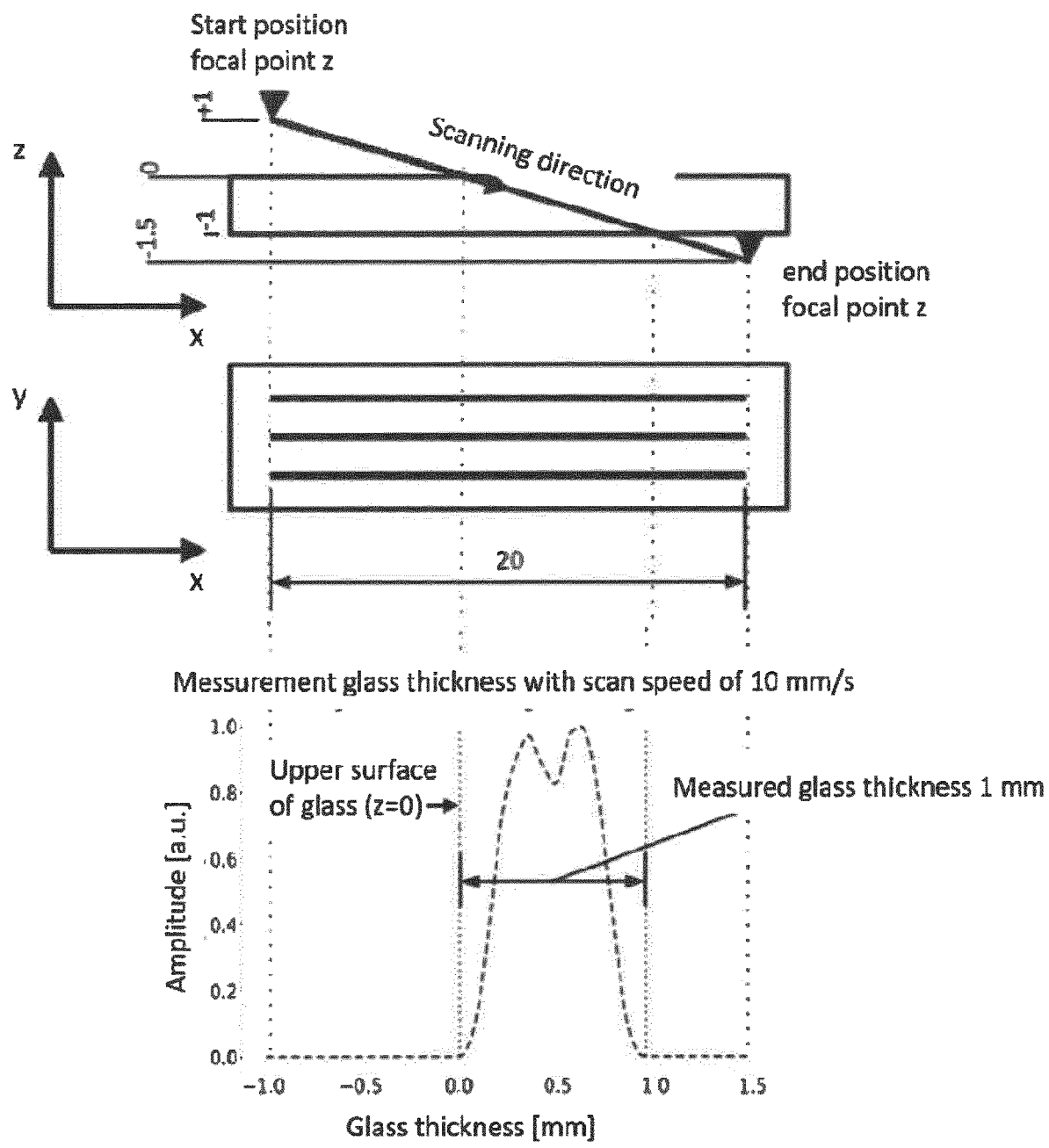

FIGS. 8a and 9a shows the experimental setup and the respective results for a scanning speed of 5 mm/s and 10 mm/s, respectively. In particular, the setup consisted of an ultrashort pulse laser with a wavelength of 355 nm and a pulse width of 9.8 ps. The laser beam was coupled via optical mirrors into a dynamic optical scanning system. The F-theta focusing optic has a focal length of 56 mm. The entire optical system has a beam focus diameter of 6 μm and a Rayleigh length of 64 μm. A mechanical 3-axis CNC system allows to position the substrate (sample). The glass slides were placed and aligned with sub-micron accuracy under the scanning system, the surface of the substrate was placed in the focal plane of the beam axis as exactly as possible.

The experiments were carried out with of soda-lime glass slides of 1 mm thickness. For the test application, a line of 20 mm length and a scanning speed of 5 or 10 mm/s was drawn over the sample with an average power of 234 mW. The starting focus position was 1 mm above the glass slide (sample) and then continuously moved at a constant speed through the glass slide until a focus position 0.5 mm below the glass slide was reached. In other words, the focus position is continuously moved in the xz-direction as indicated in FIGS. 8a and 9a, wherein the sample's thickness direction corresponds to the z-direction and the sample's length and width direction corresponds to the x- and y-direction, respectively.

The acoustic signals generated during the experiments were captured by a Brüel & Kjær Type 4189 open-air microphone with a 2671 preamplifier. The microphone has a frequency range from 6.3 Hz to 20 kHz, a dynamic range from 14.6 to 146 dB and a sensitivity of 50 mV/Pa. The microphone was positioned at an application level with a distance of a few to several hundred millimeters without precision requirements. From the preamplifier, the signal was fed via BNC cables to a NEXUS 2693 as a constant power supply of 31.6 mV/Pa and further on to a multi-functional I/O device. The signals were transferred to a computer via a USB 2.0 interface at a sampling rate of 44 kS/s. A self-developed software routine combines the digitized signals into frequency band groups of different bandwidths. The reading out was performed by capturing frequency band groups, which corresponded to integer multiples of 5 kHz, to reduce the amount of data to be processed and the influence of noise.

Figure 8B:
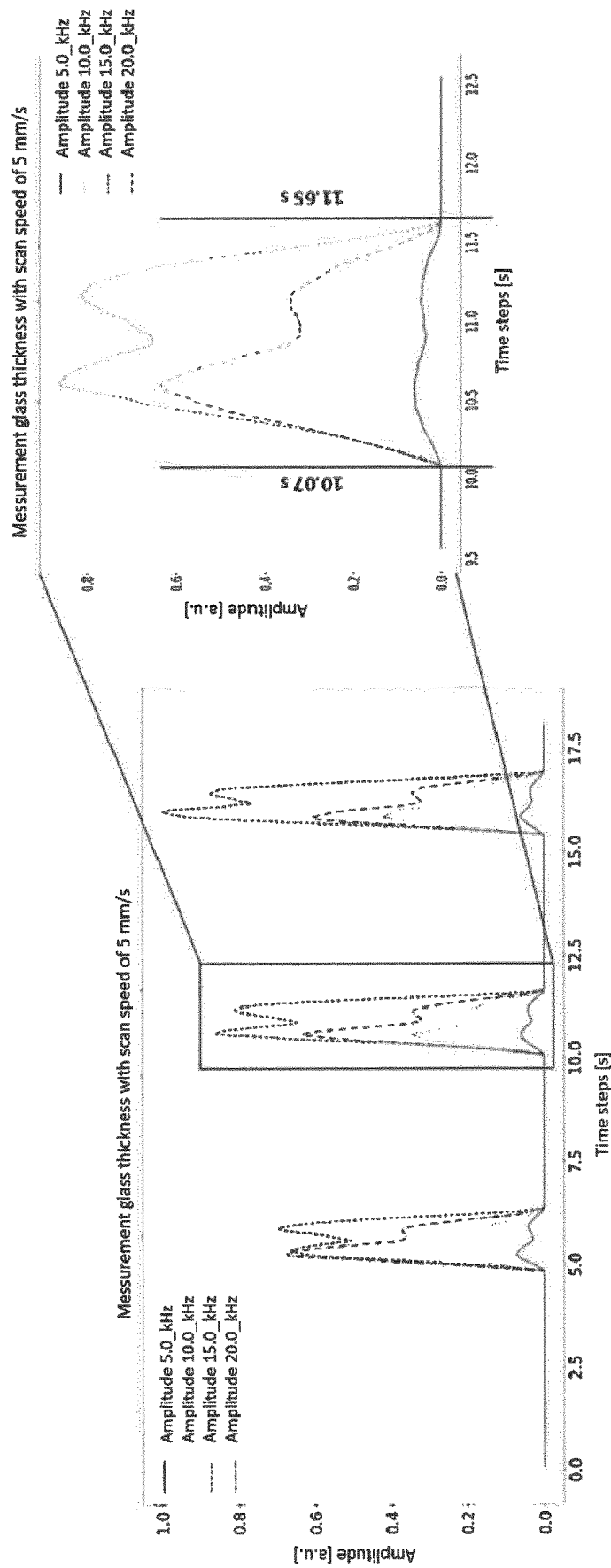
Figure 9B:
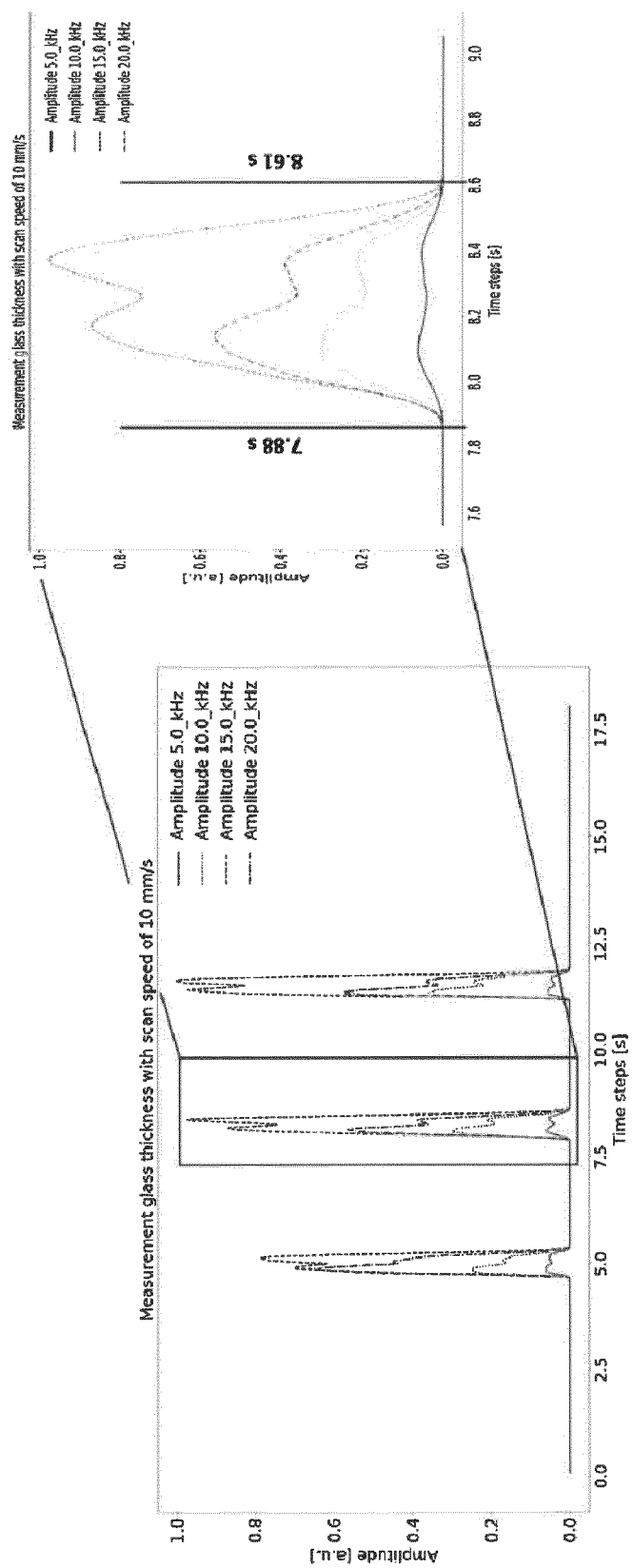

The glass thickness was determined by extracting the time when the signal amplitude of a predetermined threshold was exceeded. If the signal amplitude subsequently did fall below the threshold value again, the time is also read out. The time between the two points in time and the scan speed was used to calculate the glass thickness, taking into consideration the total shift of the focus position. The final result of the thickness is shown in the graph of FIGS. 8a and 9a, whereas the respective signals measured over time are shown in FIGS. 8b and 9b. In particular, FIGS. 8b and 9b show the measured amplitude signals over time for different frequency band groups, namely for 5 kHz, 10 kHz, 15 kHz and 20 kHz.

Figure 10A:
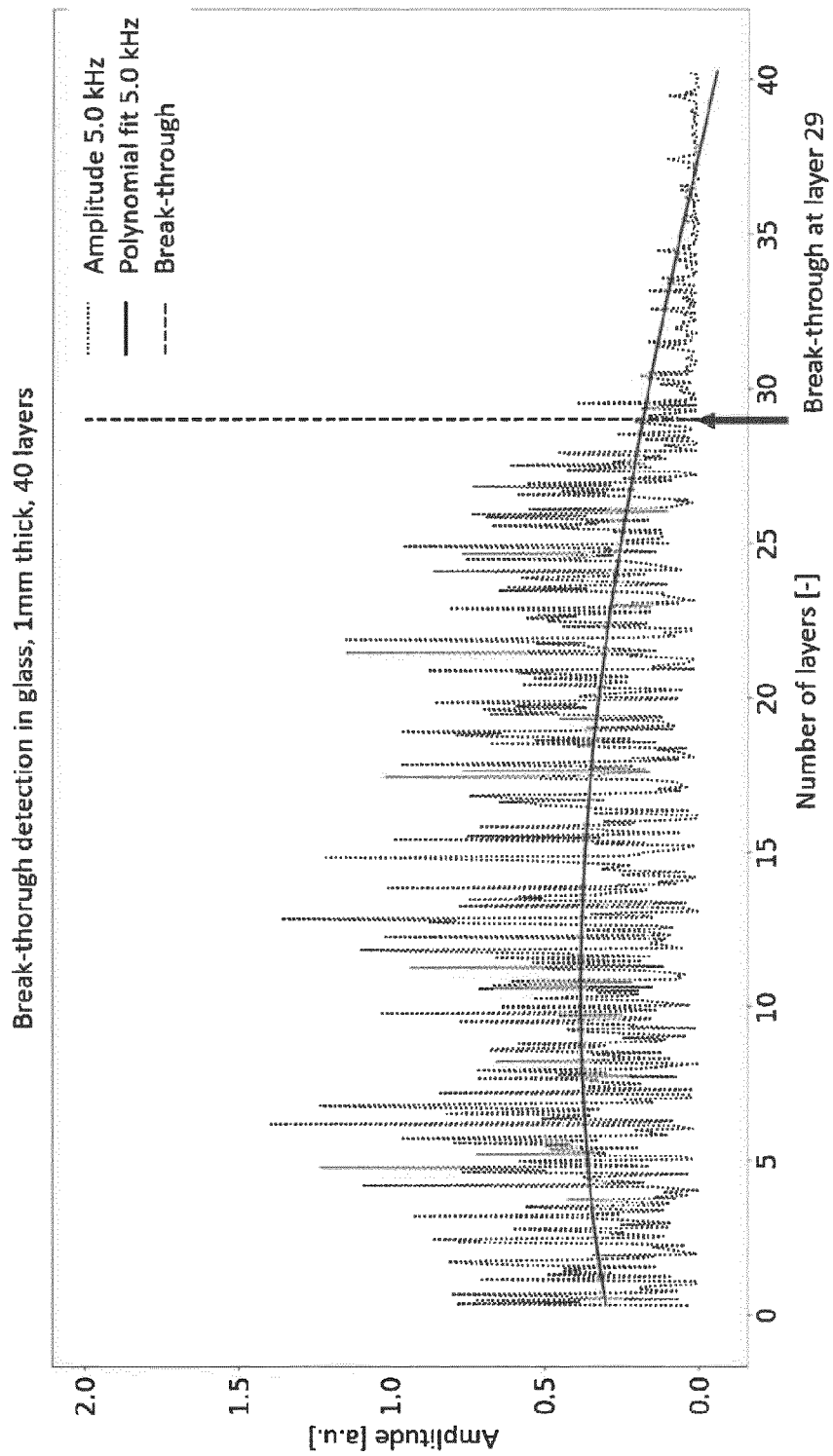
FIG. 10a-c shows experimental results for break-through detection in a 40 layer ablation process in accordance with an embodiment of the present invention.
Figure 10B:
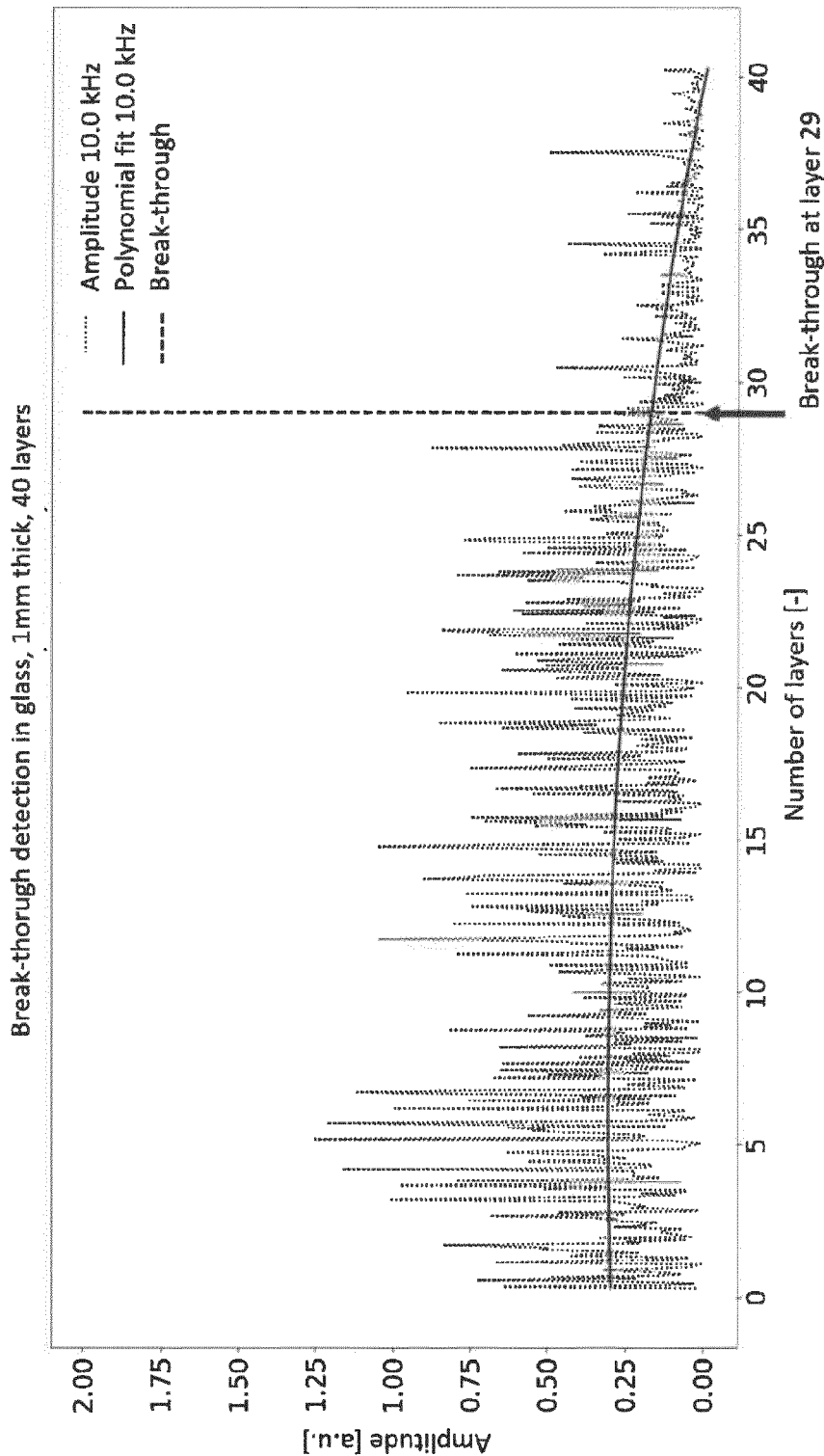
Figure 10C:
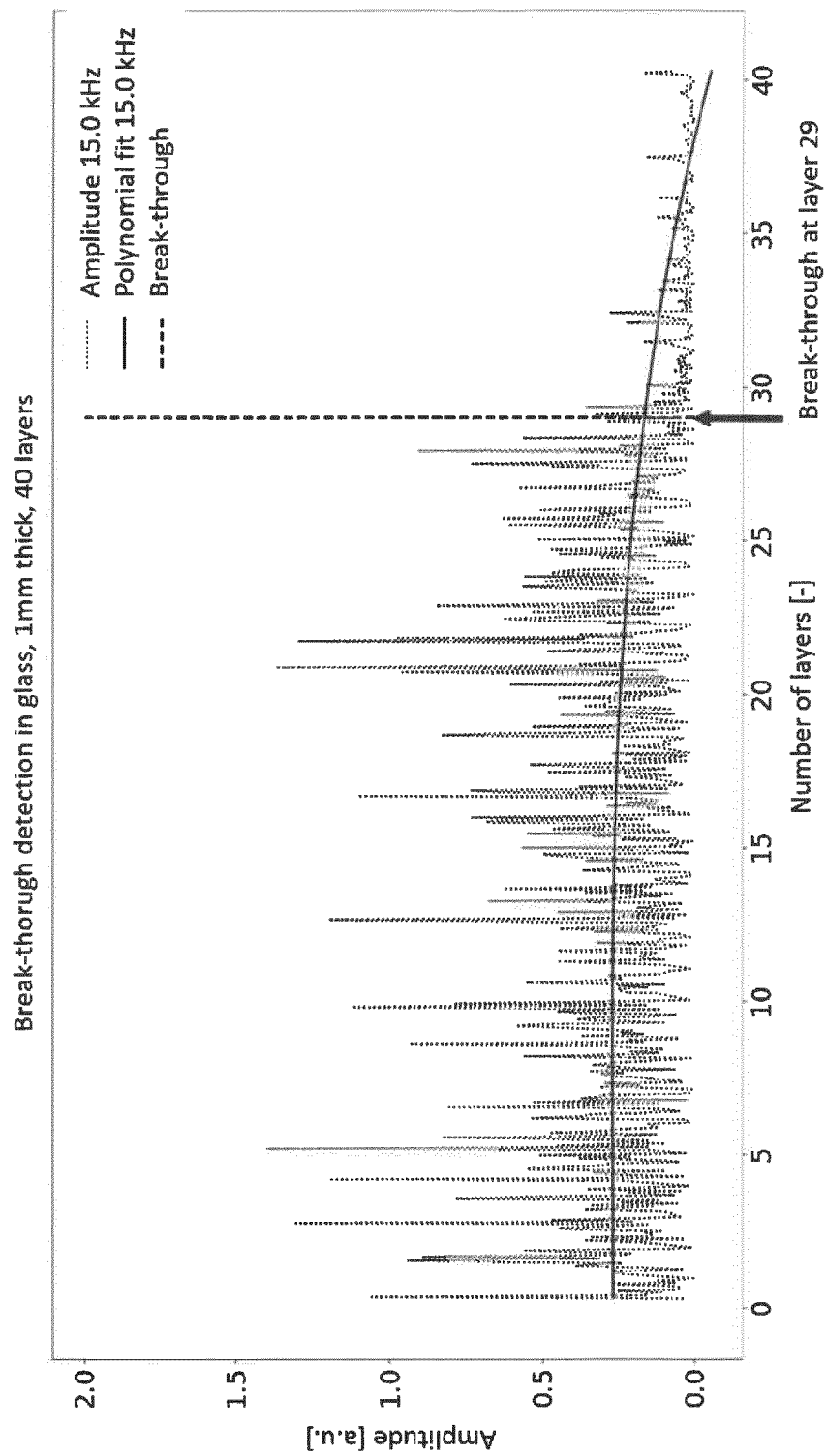
Figure 10D:
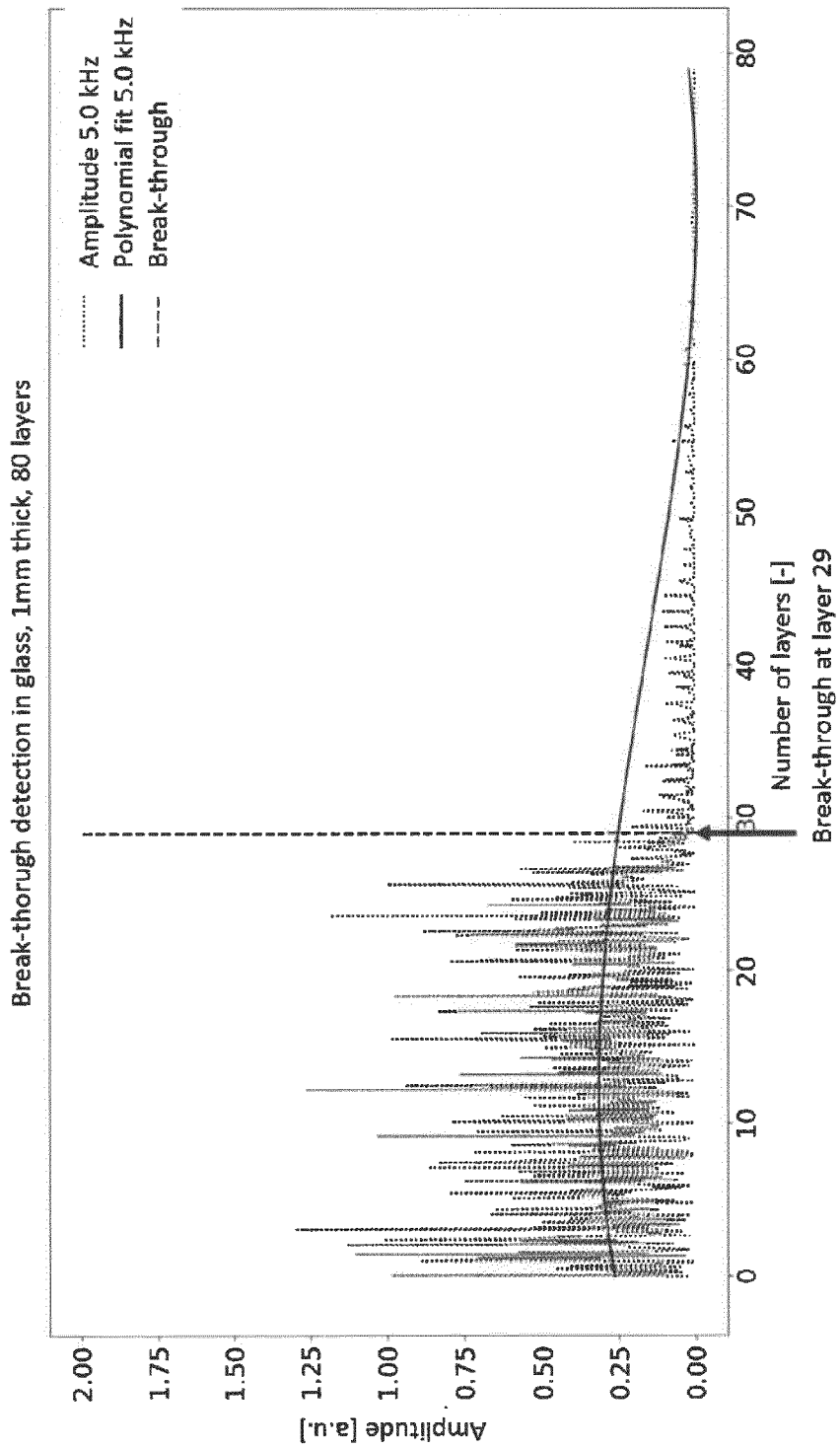
FIG. 10d-f shows experimental results for break-through detection in a 80 layer ablation process in accordance with an embodiment of the present invention.
Figure 10E:
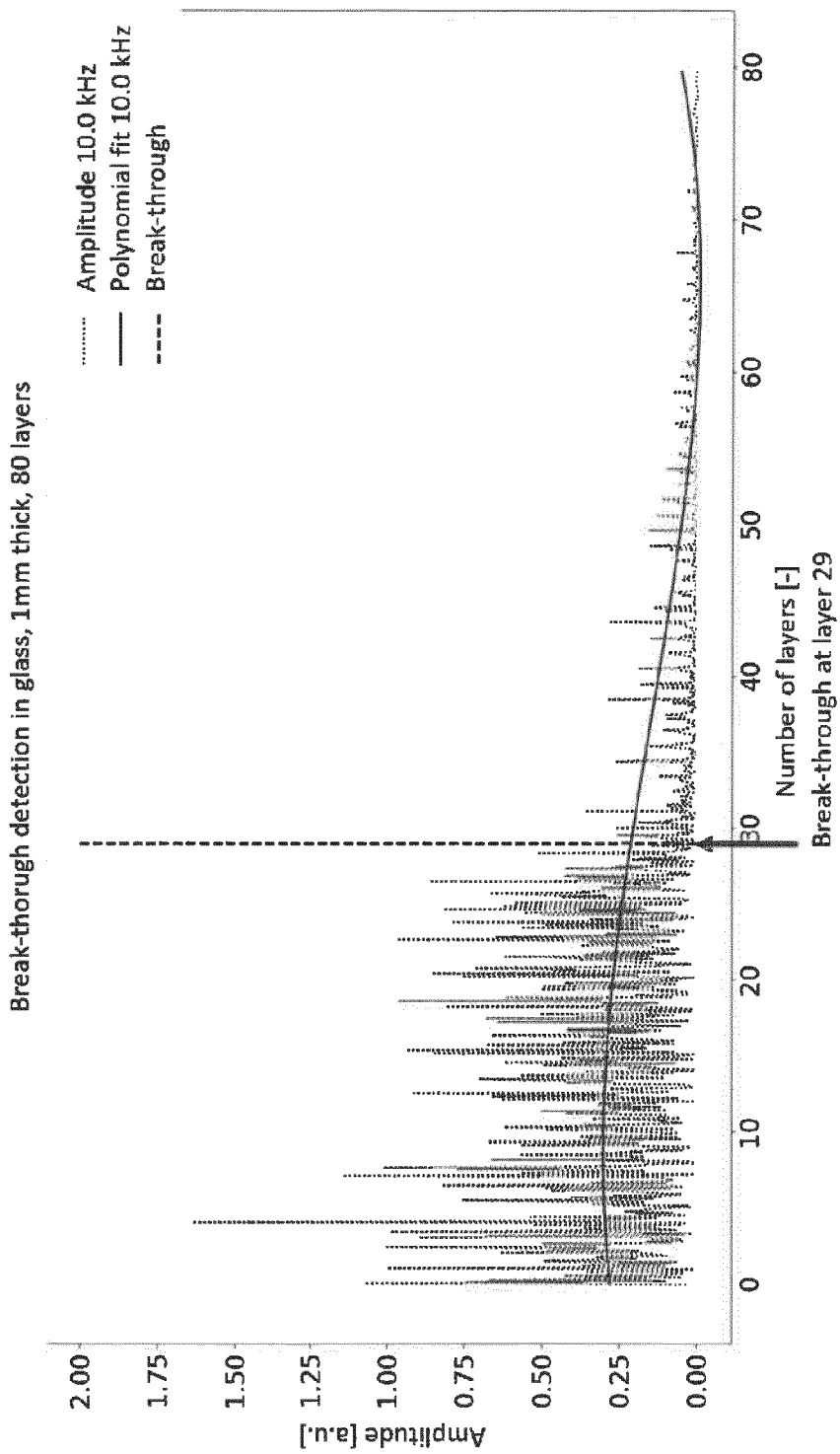
Figure 10F:
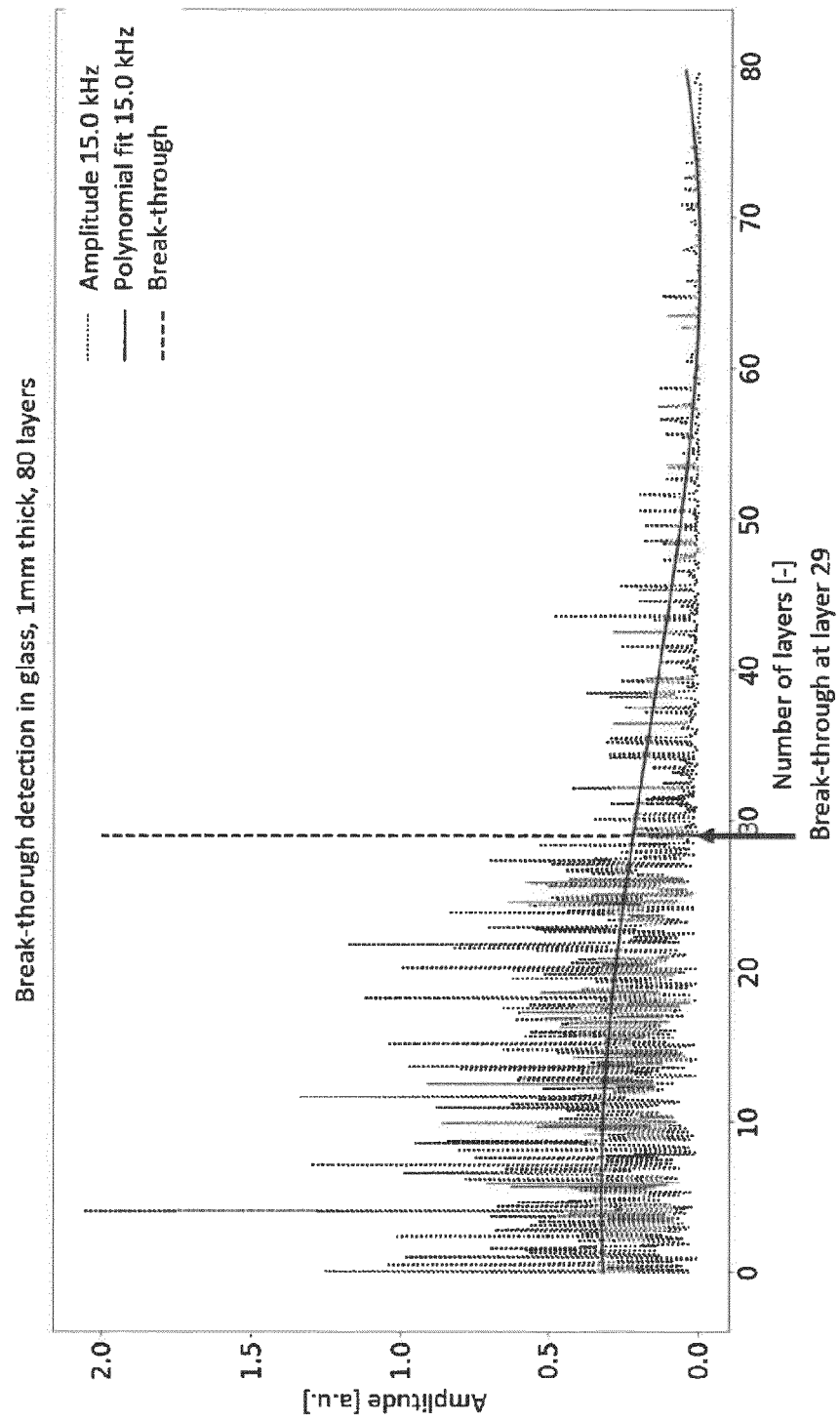

Next, with reference to FIGS. 10a-f experimental results for break through detection in a 40 and 80 layer ablation process, respectively, in accordance with an embodiment of the present disclosure is described in the following together with details about the respective setup. In particular, FIGS. 10a-c show experimental results for break through detection in a 40 layer ablation process for frequency band groups of 5 kHz, 10 kHz and 15 kHz. Moreover, FIGS. 10d-f show experimental results for break through detection in a 80 layer ablation process for frequency band groups of 5 kHz, 10 kHz and 15 kHz.

The experimental setup consisted of an ultrashort pulse Coherent AVIA LX 355 laser. The laser beam was coupled via optical mirrors into a highly dynamic optical scanning system. The scanning system deflects the laser beam in a controlled manner in the xy-plane and shifts the focus position in the beam z-axis relative to the application plane in predetermined steps. The scanning system is followed by an F-theta focusing optic with a focal length of 250 mm. The entire optical system has a beam focus diameter of 30 μm and a Rayleigh length of 1.67 mm. The experimental setup comprises a mechanical 3-axis CNC system with a work surface to position the substrate with micrometer accuracy under the scanning system in the focal plane of the beam axis as exactly as possible.

The experiments were carried out with soda-lime glass slides with a thickness of 1 mm. The test application consisted of the layer-by-layer removal of a cylindrical bore with a diameter of 1.5 mm. Controlled by the scanner software, the circular cross-section of the hole was ablated with lines at a distance of 30 μm. After the scanning system had finished ablating the first circular cross-section, the focus position was adjusted in the direction of the beam axis and the circular cross-section was ablated again, this process was repeated until a breakthrough was achieved.

The acoustic signals generated during the experiments were captured by a Brüel & Kjær Type 4189 open-air microphone with 2671 preamplifier. The microphone has a frequency range from 6.3 Hz to 20 kHz, a dynamic range from 14.6 to 146 dB and a sensitivity of 50 mV/Pa. The microphone was oriented towards the application field at a distance of a few to several hundred millimeters without precision requirements. That is, the microphone was directed towards the sample that was subjected to the laser beam. From the preamplifier, the signals were fed via BNC cables to a NEXUS 2693 as a constant power supply of 31.6 mV/Pa and further on to a multi-functional I/O device and to a computer via a USB 2.0 interface at a sampling rate of 40 kS/s. A self-developed software routine combined the digitized signals into frequency band groups of different bandwidths. By reading out the frequency band groups, which correspond to integer multiples of 5 kHz, the amount of data to be processed and the influence of noise was reduced. The signal amplitudes above a certain threshold value were extracted from the individual frequency band groups. A polynomial fit was formed for each frequency band group and in combination with falling edges the time of the shot through (break-through) was detected. The correct calculated shot through time may be validated with an external light microscope.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A method for creating a hole in a glass container with a medium stored therein, comprising:
    focusing laser pulses with a wavelength in the ultraviolet regime onto the glass container at a location having an air bubble on the inside of the glass container, said location being on a curved portion connecting a bottle-neck and a body of the glass container, to create a hole by laser ablation in the glass container;
    wherein an energy of the laser pulses is less than twice the laser pulse energy required at the ablation threshold of the glass container.

2. The method of claim 1, wherein the energy of the laser pulses is less than 30% of the laser pulse energy required at the ablation threshold of the glass container.

3. The method of claim 1, which further comprises stopping the laser pulses onto the glass container upon determination by a physical sensor that the hole has been created, wherein said physical sensor is an accelerometer or an acoustic wave detector.

4. The method of claim 3, wherein the physical sensor is an accelerometer and is located on an outside surface of the glass container or on a structure that is directly connected to the glass container.

5. The method of claim 3, wherein the physical sensor is an acoustic wave detector.

6. The method of claim 1, which further comprises adjusting laser process parameters according to feedback from a physical sensor, wherein said physical senso is an accelerometer or an acoustic wave detector.

7. The method of claim 6, wherein the physical sensor is an accelerometer and is located on an outside surface of the glass container or on a structure that is directly connected to the glass container.

8. The method of claim 6, wherein the physical sensor is an acoustic wave detector.

9. The method of claim 1, wherein the laser pulses have a repetition rate of $f \leq 10$ kHz.

10. The method of claim 9, wherein said laser pulses have a repetition rate of $f \leq 7$ kHz.

11. The method of claim 10, wherein said laser pulses have a repetition rate in the range of $2 \text{ kHz} \leq f \leq 5 \text{ kHz}$.

12. The method of claim 1, which further comprises sealing the hole in the glass container with a ceramic polymer composite or a ceramic glass material.

13. The method of claim 1, wherein the laser pulses are applied to the surface of said location on the glass container in a predetermined pattern within a predetermined area over the surface of the glass container.

14. The method of claim 1, which further comprises:
    withdrawing a sample of the medium from the glass container through the hole.

15. The method of claim 14, which further comprises analyzing said sample for a chemical fingerprint and/or a biological fingerprint.

16. The method of claim 15, wherein the fingerprint analysis comprises performing chromatographic separation and high resolution mass spectrometry of the sample medium and/or performing DNA analysis of the sample medium.

17. The method of claim 1, wherein said medium is wine; and which further comprises withdrawing a sample of the medium from the glass container through the hole; and
    sealing the hole in the glass container with a ceramic polymer composite or a ceramic glass material.

18. The method of claim 17, which further comprises stopping the laser pulses onto the glass container upon determining that the hole has been created in the glass container by using a physical sensor, wherein said physical sensor is an accelerometer or an acoustic wave detector.

* * * * *